US 8,219,932 B2

(12) United States Patent
Rhee et al.

(10) Patent No.: US 8,219,932 B2
(45) Date of Patent: Jul. 10, 2012

(54) TERMINAL AND METHOD FOR DISPLAYING CONTENTS INFORMATION AS ICONS AND THUMBNAIL IMAGES IN A LIFE-DIARY

(75) Inventors: Young Ho Rhee, Seoul (KR); Jung Hun Kim, Busan Metropolitan (KR); Ju Youn Lee, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 477 days.

(21) Appl. No.: 12/357,161

(22) Filed: Jan. 21, 2009

(65) Prior Publication Data

US 2009/0187849 A1 Jul. 23, 2009

(30) Foreign Application Priority Data

Jan. 22, 2008 (KR) .................. 10-2008-0006593

(51) Int. Cl.
*G06F 3/048* (2006.01)
(52) U.S. Cl. ............. 715/838; 715/781; 707/E17.016; 707/E17.044
(58) Field of Classification Search .............. 707/3, 5, 707/951, E17.016, E17.044; 715/716–726, 715/763–764, 781, 838
See application file for complete search history.

(56) References Cited

U.S. PATENT DOCUMENTS

| | | | |
|---|---|---|---|
| 6,996,782 B2 * | 2/2006 | Parker et al. ............. 715/764 |
| 7,325,198 B2 * | 1/2008 | Adcock et al. ............ 715/722 |
| 7,391,423 B1 * | 6/2008 | Manzari et al. ........... 345/619 |
| 2005/0105374 A1 * | 5/2005 | Finke-Anlauff et al. ..... 365/232 |
| 2005/0108643 A1 * | 5/2005 | Schybergson et al. ....... 715/713 |
| 2006/0020899 A1 * | 1/2006 | Gusmorino et al. ......... 715/765 |
| 2006/0085743 A1 * | 4/2006 | Baudisch et al. ........... 715/526 |
| 2006/0101035 A1 * | 5/2006 | Mustakallio et al. ....... 707/100 |
| 2006/0156245 A1 * | 7/2006 | Williams et al. ........... 715/764 |
| 2007/0192739 A1 * | 8/2007 | Hunleth et al. ............ 715/823 |
| 2008/0307360 A1 * | 12/2008 | Chaudhri et al. ........... 715/835 |
| 2009/0049410 A1 * | 2/2009 | Fagans et al. .............. 715/838 |
| 2009/0144660 A1 * | 6/2009 | Wako ...................... 715/835 |

OTHER PUBLICATIONS

Shelley O'Hara, Easy Microsoft Office Outlook 2003, Sep. 18, 2003, Que, pp. 156-157, 182-183.*
Steve Johnson, Show Me Microsoft Office Outlook 2003, Sep. 19, 2003, Que, pp. 252-256.*

* cited by examiner

*Primary Examiner* — Kieu Vu
*Assistant Examiner* — James T Durkin
(74) *Attorney, Agent, or Firm* — Jefferson IP Law, LLP (57) ABSTRACT

A terminal and method for displaying contents information is provided for showing the contents information in efficient and intuitive manner. The terminal includes a memory unit for storing contents and creation times of the contents, a display unit for displaying a life diary screen including a time axis, a date axis and contents graph in a life diary mode, a key input unit for receiving a date selection command for selecting a date on the date axis and a control unit for retrieving contents created on the selected date, counting numbers of contents per date and controlling a display of the contents graph generated based on the number of the contents per date, when a date is selected through the key input unit.

19 Claims, 11 Drawing Sheets

Oct, 2007   Nov, 2007

TERMINAL AND METHOD FOR DISPLAYING CONTENTS INFORMATION AS ICONS AND THUMBNAIL IMAGES IN A LIFE-DIARY

PRIORITY

This application claims the benefit under 35 U.S.C. §119 (a) of a Korean patent application filed on Jan. 22, 2008 in the Korean Intellectual Property Office and assigned Serial No. 10-2008-0006593, the entire disclosure of which is hereby incorporated by reference.

BACKGROUND OF THE INVENTION

1. Field of the Invention

The present invention relates to contents management. More particularly, the present invention relates to a terminal and method for displaying contents information in a life diary mode in a contents graph based on a number of contents per creation date and time arranged along a date and time axes.

2. Description of the Related Art

With the advance of the wireless communication and semiconductor technologies, various types of portable devices are becoming increasingly popular in everyday life. Examples of the portable devices include a cellular phone, digital cameras, Personal Digital Assistants (PDAs), MP3 Players, Portable Multimedia Players (PMPs), mobile broadcast receivers, navigators, electronic dictionaries, and the like. Recent trends have emerged in the form of mobile convergence in which functionalities of the portable devices are integrated into a single handheld terminal. For example, recent mobile phones increasingly incorporate digital cameras, video communication modules, multimedia communication modules, wireless Internet access modules, short range wireless communication modules, broadcast reception modules, etc.

Recently, portable devices are being provided with storage means for storing a large amount of data. In the case of a mobile phone, the storage means stores various types of data, such as voice and message communication log data, schedules and memos input by a user, and multimedia data, such as still and motion pictures, and audio files. As various types of data have become increasingly diversified and data has increased in size, there has been a need to develop a method for efficiently managing and processing the diversified data.

In a conventional data processing method, data is classified into the type of data and processed by its type. For example, communication logs are arranged in temporal order without engaging with other types of data. Also, the communication logs are allowed access, via a specific menu, to be displayed without associating with other types of data. Such data processing method is sufficient for relatively less diversified data and small-size data, but inappropriate for handling large data and highly diversified data. Accordingly, creation and utilization of rich information is restricted.

Therefore, a need exists for a terminal and method for processing various types of data in an integral manner and enriching the utilization of the data.

SUMMARY OF THE INVENTION

An aspect of the present invention is to address at least the above-mentioned problems and/or disadvantages and to provide at least the advantages described below. Accordingly, an aspect of the present invention is to provide a terminal and method for simultaneously displaying contents information that is capable of classifying pre-generated contents into categories and displaying the contents belonging to different categories.

Another aspect of the present invention is to provide a terminal and method for displaying contents information that is capable of displaying dates of the content objects on a screen of the terminal.

Still another aspect of the present invention is to provide a terminal and method for displaying contents information that is capable of providing information on the contents in the form of a contents graph in which numbers of the contents are sorted by a creation date within a predetermined time window, e.g., 2 months.

Yet another aspect of the present invention is to provide a terminal and method for displaying contents information that is capable of sharing information of the contents created by multiple terminals on a network.

In accordance with an aspect of the present invention, a terminal is provided. The terminal includes a memory unit for storing contents and creation times of the contents, a display unit for displaying a life diary screen including a time axis, a date axis, and contents graph in a life diary mode, a key input unit for receiving a date selection command for selecting a date on the date axis, and a control unit for, when a date is selected through the key input unit, retrieving contents created on the selected date, counting numbers of contents per date and controlling a display of the contents graph generated on the basis of the numbers of the contents per date.

In accordance with another aspect of the present invention, a method for displaying information on contents stored in a terminal is provided. The method includes counting a number of contents per date in a life diary mode, displaying a life diary screen including a time axis, a date axis, and a contents graph displaying the number of contents counted per date along the date axis, selecting a period on the date axis in response to a date selection command, and displaying content objects representing the contents created at the selected date.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those or ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In the following description, the term "contents" means all types of data objects that may be stored, determined and executed in a terminal, and transmitted to and received from another terminal according to a user's intention. The contents include phone numbers, call logs, messages, audio files, video files and text files. The term "time axis" means the timeline representing a day that is presented with time points divided in a predetermined unit of time, e.g., one hour or six hours. In the following description, the time axis appears as a vertical axis of a graph displayed on a screen. The term "date axis" means the timeline representing a relatively longer time duration, e.g., two months, and appears as a horizontal axis of the graph displayed on the screen.

The term "contents graph" denotes a set of curves associated with numbers of contents created at dates arranged along the linear date axis. The contents graph represents a number of contents created at all dates along the date axis. The term "friend select box" denotes an application object with which a user may select one of the users registered as friends on a website, i.e., friends. Life diaries of the registered friends are shared among each other. The term "world select box" denotes an application object with which the user may select one of the users who are unregistered as friends on the website but using life diaries. The world select box is activated in response to the user's command and presents a list of users unregistered but using life diaries on the web such that the user may select a user from the list and verify information on the unregistered user in the access range permitted by the friend.

In the following description, an exemplary method for displaying contents information is described in association with a mobile terminal. The mobile terminal may be any of a cellular phone, a wired/wireless phone, a Portable Multimedia Player (PMP), a Personal Digital Assistant (PDA), a Smartphone and their equivalent communication and multimedia devices.

Figure 1:
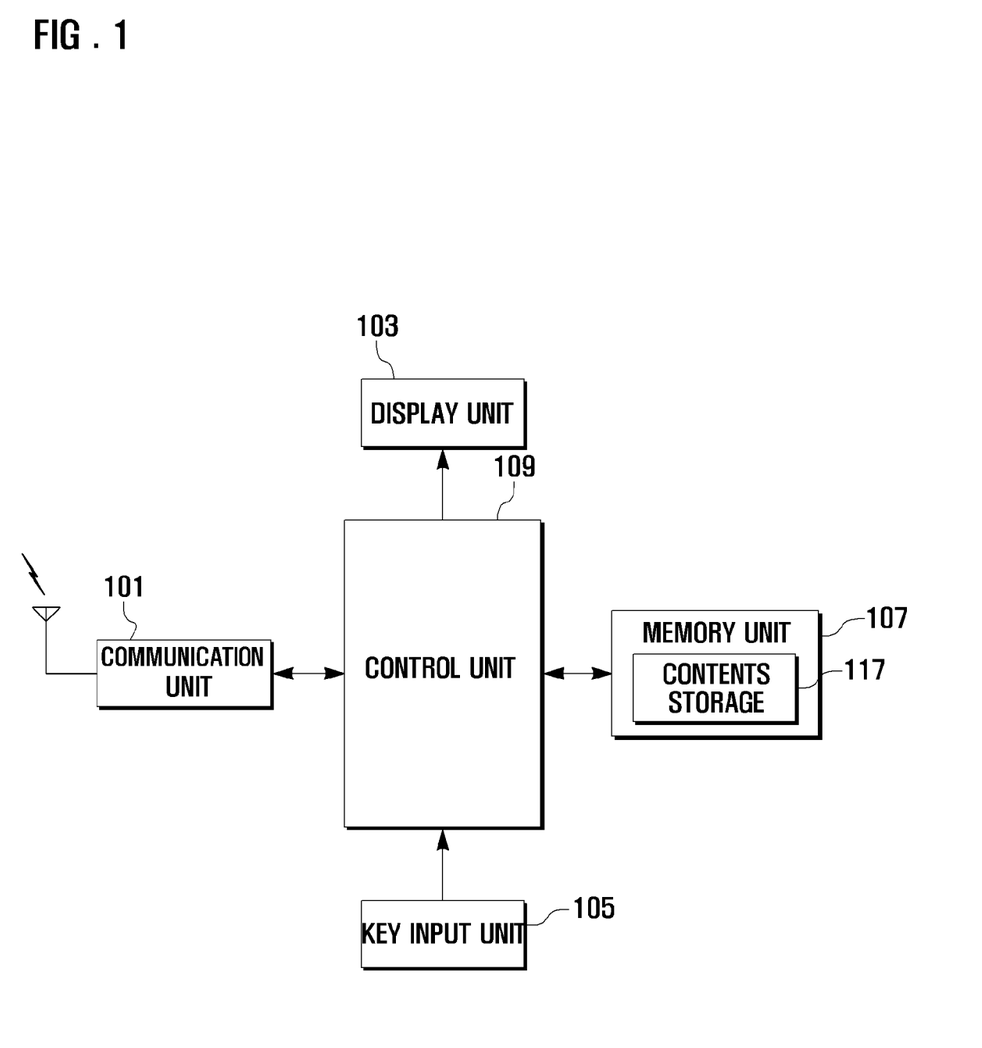
FIG. 1 is a block diagram illustrating a terminal configuration according to an exemplary embodiment of the present invention.

FIG. 1 is a block diagram illustrating a terminal configuration according to an exemplary embodiment of the present invention.

Referring to FIG. 1, the terminal includes a communication unit 101, a display unit 103, a key input unit 105, a memory unit 107 and a control unit 109.

The communication unit 101 is responsible for a communication function of the terminal. The communication unit 101 may be a Radio Frequency (RF) module or a short range wireless communication module such as a Bluetooth module, an Infrared Data Association (IrDA) module and a ZigBee module. In an exemplary RF module, the communication unit 101 includes an RF transmitter for up-converting and amplifying a transmission signal frequency and an RF receiver for low noise amplifying and down-converting a received signal frequency. The communication unit 101 may be configured to communicate with another terminal through at least one of local area networks, short range wireless networks and cellular networks.

The display unit 103 displays an operation status and functional information of the terminal in the form of a visual image. Specifically, the display unit 103 is configured to display in life diary mode a life diary screen (see FIG. 6A) composed of content objects 4 representing corresponding contents, a time axis 1, a date axis 3, a contents graph 2, a contents filter 5, a friend select box 6 and a world select box 7.

Figure 6A:
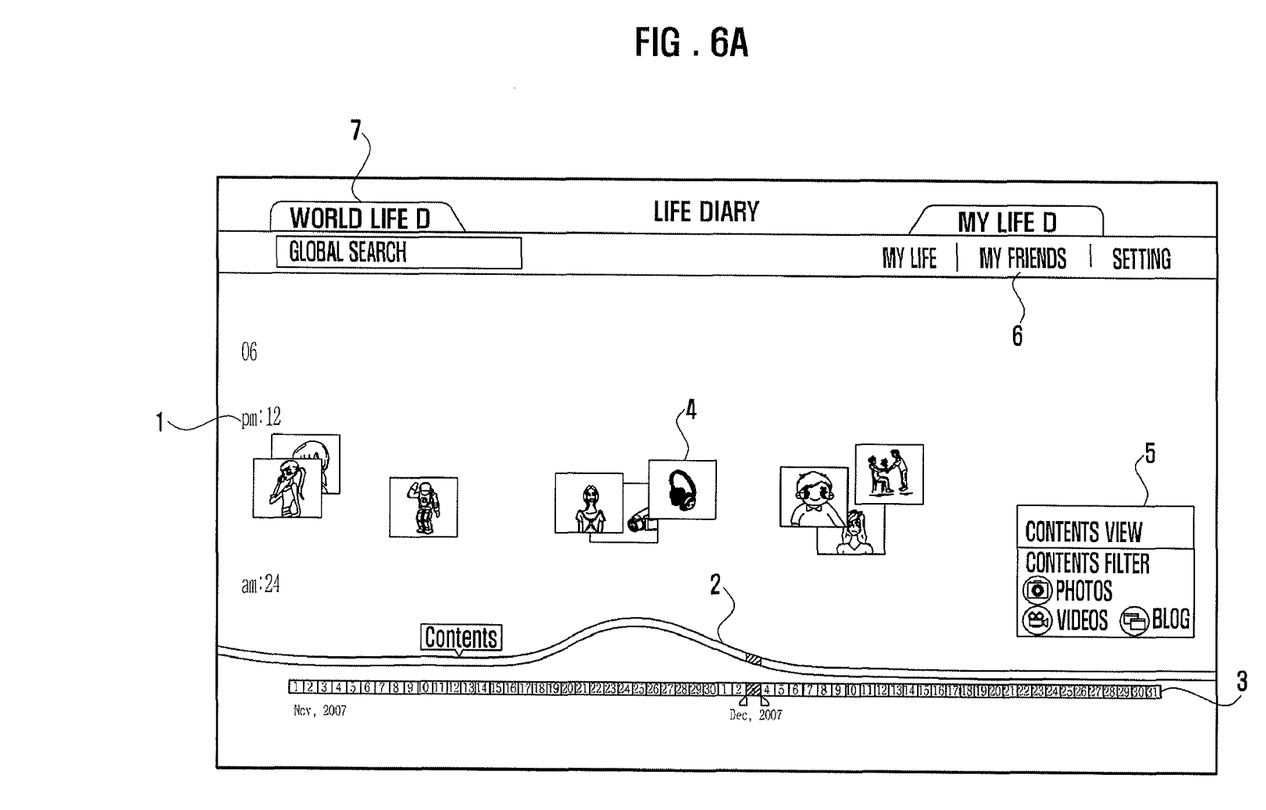
FIG. 6A is a life diary screen image of a contents information display method according to an exemplary embodiment of the present invention.
Figure 6B:
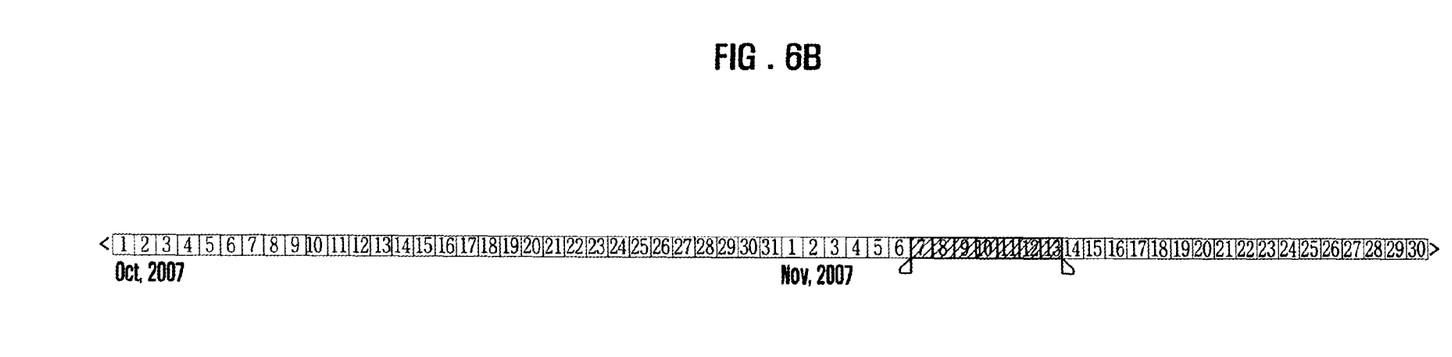
FIG. 6B is a diagram illustrating a date axis of a life diary screen according to an exemplary embodiment of the present invention.

The time axis 1 is a vertical axis arranged at the left side of the life diary screen to show a time of day in a unit of time, such as an hour. The date axis is a horizontal axis arranged at the bottom of the life diary screen to show the date within a certain period, e.g., two months. On the date axis 3, the user may select one or more contiguous dates. FIG. 6B shows the date axis 3 when more than one date is selected by the user.

The contents graph 2 is arranged in parallel with the date axis 3 and intuitively shows how many contents have been created on each date. The contents graph 2 may be created with percentages of values obtained by dividing a number of the contents created on each date by the number of contents on a date on which the greatest number of contents is created in the total period, e.g., two months. That is, the contents graph is generated according to formula (1).

$$\frac{\text{No. of Contents of Date}}{\text{Greatest No. of per} - \text{Date Contents}} \times 100\% \quad (1)$$

Using formula (1), the contents graph 2 rises at a location above the date on which the greatest amount of contents are created. For example, if 500 contents are created on a specific date and the greatest number of per-date contents is 1000, the height of the graph on the specific date becomes 50% of the height on the date which the greatest number of contents is created.

The contents graph 2 is determined in association with an integrated number of all types of contents. In this case, when a specific user is selected from the world select box 7, a corresponding contents graph is displayed.

Figure 6C:
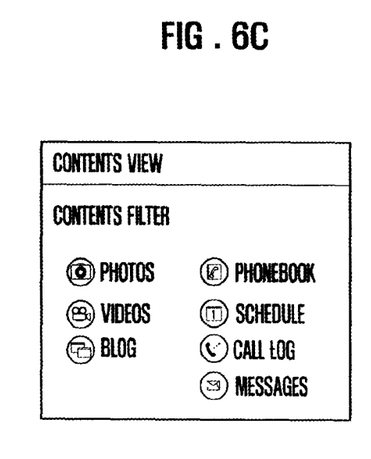
FIG. 6C is a diagram illustrating a contents filter window of a life diary screen according to an exemplary embodiment of the present invention.
Figure 6D:
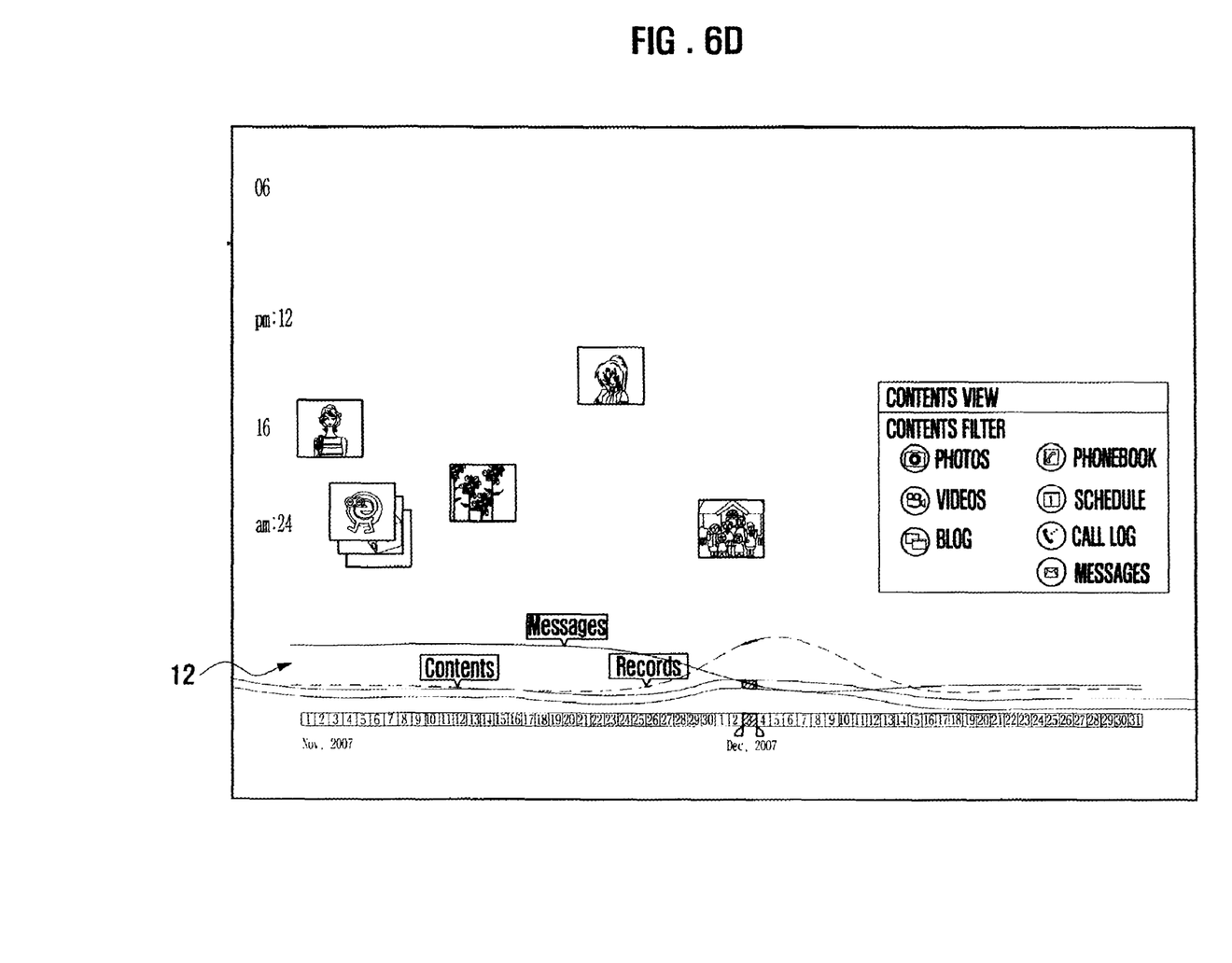
FIG. 6D is a life diary screen image of a contents information display method according to an exemplary embodiment of the present invention.

The contents graph may be displayed in the form of a set of multiple curves corresponding to different types of contents that are filtered by contents filter 5 (see reference numeral 12 in FIG. 6D) or as a single curve generated based on integrated numbers of the various types of contents. Referring to FIG. 6D, the contents graph 12 includes a content curve associated with the contents of photos, videos, blogs and the like; a record curve associated with the contents of phonebook items, schedule items and the like; and a message curve associated with the contents of call logs, Short Message Service (SMS) messages and the like.

Returning to FIG. 6A, the contents filter 5 is presented in the form of a window including content type filters for filtering various types of contents which content objects are to be displayed on the life diary screen. The contents filter 5 is positioned at a specific region of the life diary screen (a right bottom corner in FIG. 6D). Here, the content type filters are configured to filter the types of contents, i.e., photos, blogs, videos, phonebook items, schedule items, call logs, messages and the like. The contents filter 5 is configured with multiple content type filters for selectively displaying contents as shown in FIG. 6C.

Figure 6E:
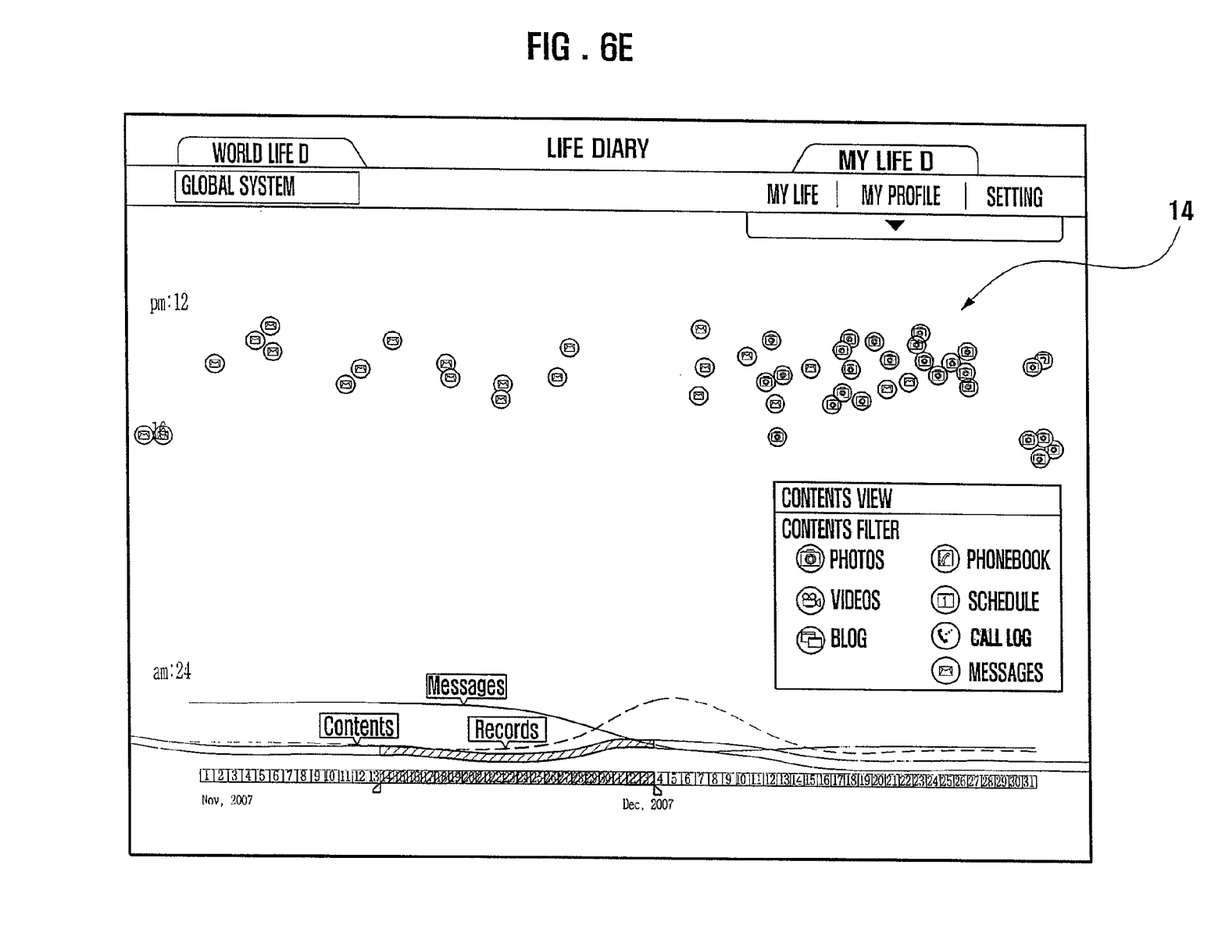
FIG. 6E is a life diary screen image of a contents information display method according to an exemplary embodiment of the present invention.

If a specific date is selected on the date axis 3 of the life diary screen, the display unit 103 displays the contents created on the selected date. At this time, the contents are displayed in the form of thumbnail images (see reference numeral 4 in FIG. 6A) or icons (see reference numeral 14 in FIG. 6E). The thumbnail images are down-scaled photos and representative images of motion pictures and blogs. If a friend is selected from the friend select box, while displaying the user's life diary screen, the display unit 103 displays the life diary screen of the selected friend. The display unit 103 may be configured to simultaneously display the user's and selected friend's contents created on the same date. If the number of contents to be displayed is greater than a threshold value, the display unit 103 displays the contents in the form of icons as shown in FIG. 6E.

When a specific date is selected, the selected date is marked in order to be distinguished from unselected dates. That is, the selected date is presented in a specific color. At this time, a portion of the contents graph corresponding to the selected date is also marked to be distinguished from other portions of the contents graph.

Figure 7A:
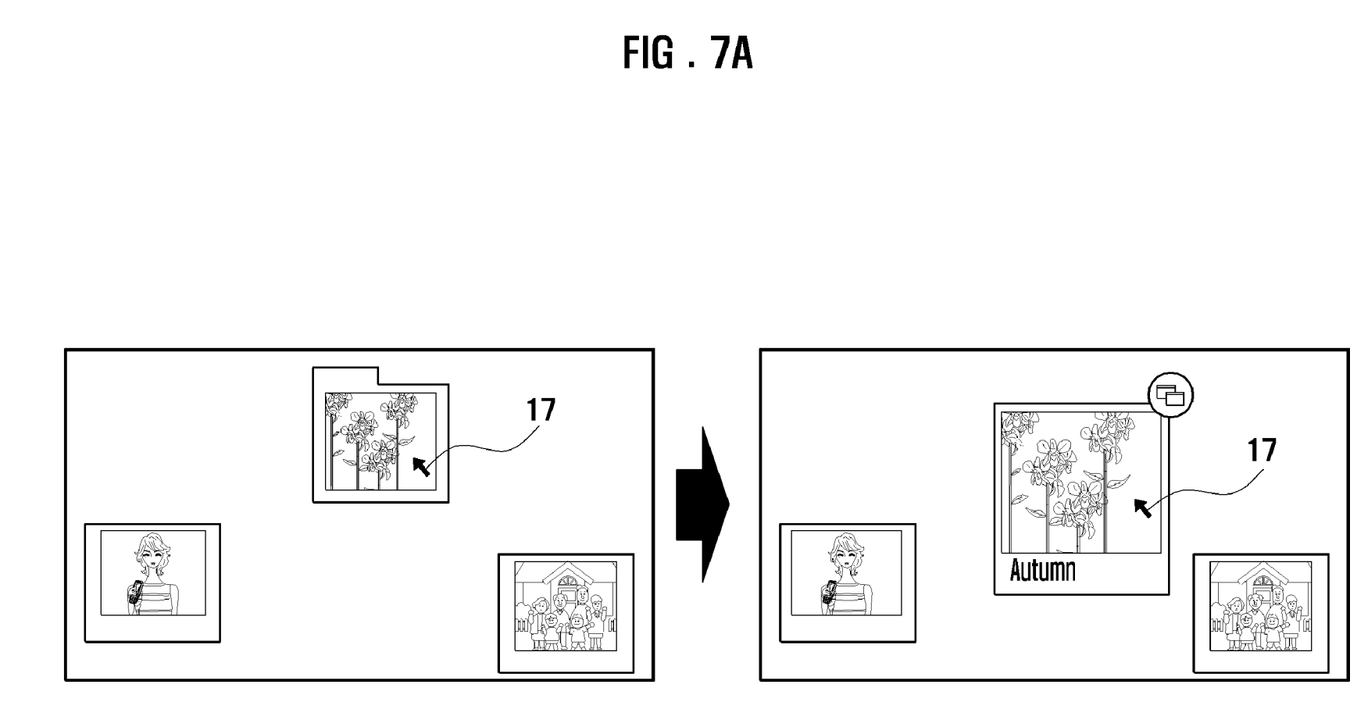
FIG. 7A is a diagram illustrating a method for enlarging a thumbnail image representing a content in a contents information display method according to an exemplary embodiment of the present invention.

The life diary screen is configured such that, when a cursor 17 is positioned on a specific content item, the content item is enlarged (see FIG. 7A). The life diary screen is also configured such that, when a mouse click or a key input entry is detected, while the cursor 17 is positioned on the specific content item, detailed information on the content item is displayed (see FIG. 7B).

The key input unit 105 receives command signals input by the user for controlling an operation of the terminal. Particularly, the key input unit 105 is configured to input a life diary mode selection command, a date selection command, a time selection command, a contents filter selection command, a world selection command, a friend selection command and the like. The key input unit 105 may be provided with a mouse (not shown) for selecting and manipulating specific information on the life diary screen.

The memory unit 107 stores programs and data required for operating the terminal. Particularly, the memory unit 107 includes a contents storage 117 for storing the various types of contents created in the terminal together with the creation time information. Here, the creation of contents includes transmitting contents and receiving contents.

The control unit 109 controls general operations of the terminal. The control unit 109 also controls displaying the contents on the display unit 103. The control unit 109 controls temporal information associated with contents creations to be stored within the contents storage 117 together with the contents.

In response to a life diary mode activation command input by the user, the control unit 109 controls the contents to be retrieved in a default setting and displayed on the display unit 103 in the form of representative content objects. For example, once the life diary mode request is detected, the control unit 109 retrieves the contents created on a date for today from the contents storage 117. The contents retrieved from the contents storage 117 may be randomly displayed. At this time, the control unit 109 controls the content objects corresponding to the contents to be arranged along the time axis in temporal order based on a creation time. If multiple contents have been created at the same time point, the content objects (e.g., thumbnail images) corresponding to the contents are overlappingly displayed. If multiple contiguous dates are selected, the control unit 109 controls the content objects representing the contents to be displayed in temporal order based on the creation time such that the earlier the creation date is, the more towards the left the thumbnail images are arranged. Also, the thumbnail images representing the contents created on the same date may be arranged along the time axis in temporal order based on the creation time.

When presenting the content objects, the control unit 109 determines in the preset content filters, the types of contents to be displayed. The control unit 109 also determines whether the number of each type of content is greater than a threshold value. If the number of the contents is greater than the threshold value, the control unit 109 controls the contents objects representing the contents to be displayed in the form of icons. Otherwise, if the number of contents is not greater than the threshold value, the control unit 109 controls the content objects representing the contents to be displayed in the form of thumbnail images. At this time, the control unit 109 controls the time axis, date axis, contents graph, contents filter, world selection box and friend selection box to be displayed together with the content icons or thumbnail images. In this case, the date in the today region of the date axis and its corresponding region of the contents graph are highlighted with a color different from the color of other regions.

The control unit 109 executes a function corresponding to a command input by the user. The command may be any of a date reset, a time reset, a content selection, contents filter selection and a user selection. The user selection command is input by the friend selection box or world selection box. The control unit 109 selects one or more contiguous dates on the date axis in response to the user command and displays content objects representing the contents created at the selected dates on the life diary screen in the above-described manner. While selecting the dates on the date axis, the control unit 109 retrieves the contents created at the respective dates and presents the contents objects representing the retrieved contents on the life diary screen according to a preset display format.

The control unit 109 also controls the content object representing a specific content to be enlarged when the cursor is positioned on the content object (i.e., thumbnail image or icon), and displays the detailed information on the content represented by the content object, when the content item is selected. When a content type filter is selected from the contents filter, the control unit 109 controls the contents corresponding to the selected content type filter to be displayed in a preset format.

When a registered user, i.e., a friend, is selected from the friend select box, the control unit 109 controls a life diary of the selected friend to be downloaded through the communication unit 101. The downloaded life diary is displayed in the form of a life diary screen. As described above, the friend's life diary may be displayed together with the user's life diary, i.e., my life diary. When a specific user is selected from the world select box, the control unit 109 controls the specific user's life diary to be downloaded by the communication unit 101.

The life diaries of the users selected from the friend select box and world select box may be distinguishably displayed. For example, the diary of the friend selected from the friend select box is displayed with the contents graph composed of multiple contents curves as shown in FIG. 6E. The diary of the user selected from the world select box is displayed with the contents graph of a single integrated curve as shown in FIG. 6A. Also, the contents icons may be displayed in different colors according to the content type filters corresponding to the contents represented by the icons.

Figure 2:
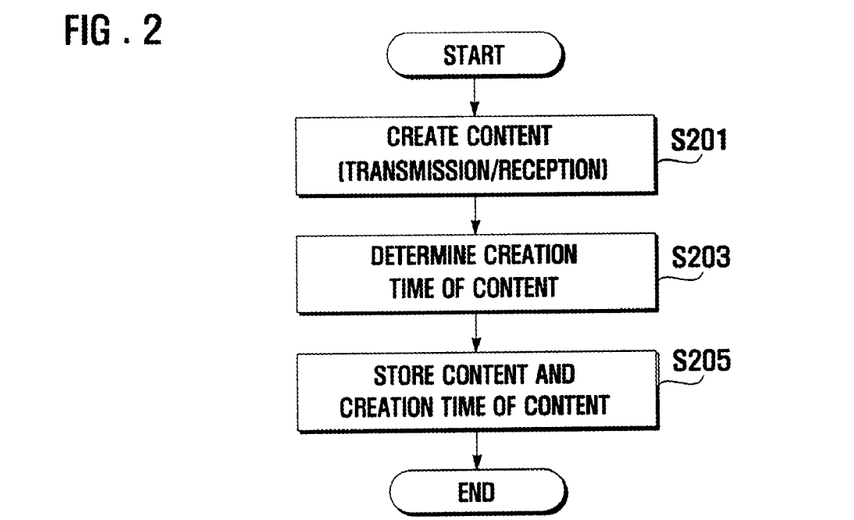
FIG. 2 is a flowchart illustrating a content storage procedure of a contents display method according to an exemplary embodiment of the present invention.

FIG. 2 is a flowchart illustrating a content storage procedure of a contents display method according to an exemplary embodiment of the present invention.

Referring to FIG. 2, the control unit 109 first detects the creation of a content in step S201. Here, the creation of the content includes transmitting and receiving a content to and from another terminal, respectively, but is not limited thereto. For example, the creation of the content may store only the information of the content that is transmitted or received.

If the creation of a content is determined, the control unit 109 determines a creation time of the content in step S203. The creation time is the time point at which the transmission or reception of the content has completed. The creation time may include date information and time information.

After determining the creation time, the control unit 109 stores the created content and creation time of the content within the contents storage 117 in step S205. The created content is mapped to the creation time of the content.

The content storage procedure is repeatedly performed, whether contents are created in the terminal. That is, the content storage procedure may be performed while the terminal performs a contents display procedure.

Figure 3:
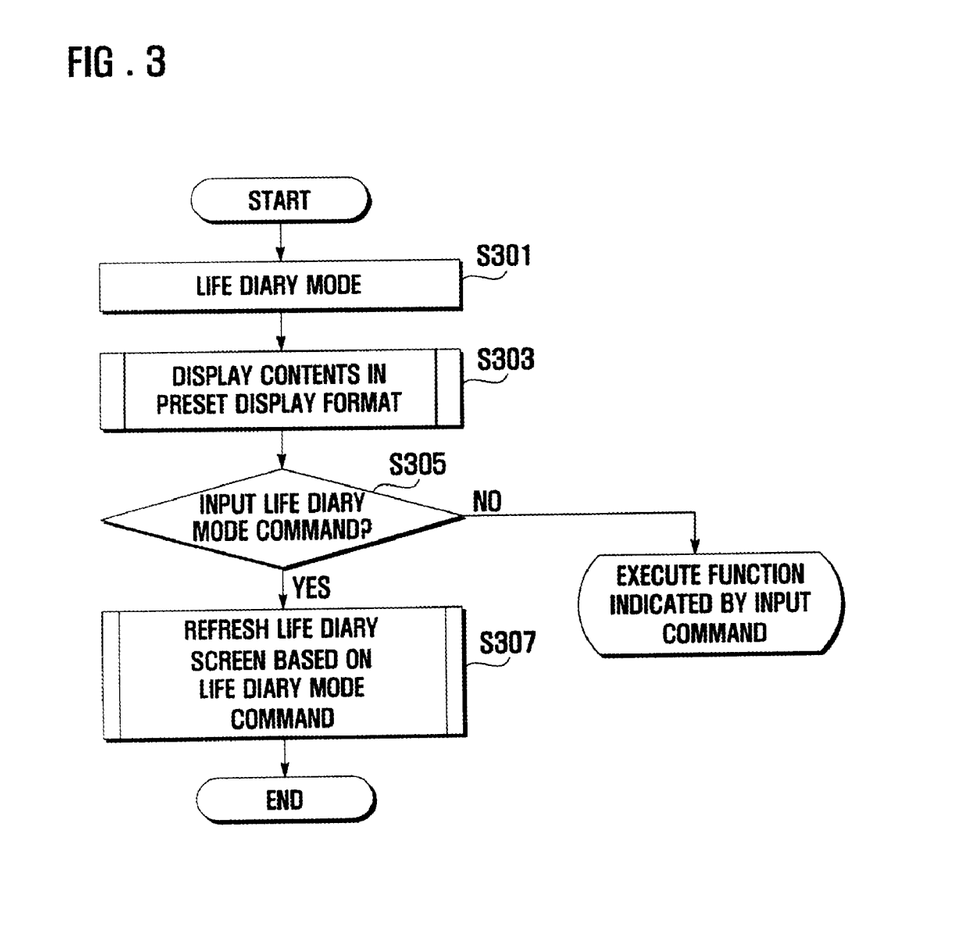
FIG. 3 is a flowchart illustrating a content display procedure of a contents display method according to an exemplary embodiment of the present invention.

FIG. 3 is a flowchart illustrating a content display procedure of a contents display method according to an exemplary embodiment of the present invention.

Referring to FIG. 3, the control unit 109 first detects an input of a life diary mode activation command in step S301. The life diary mode is activated by selecting a life diary mode activation function displayed on a function menu screen.

Figure 4:
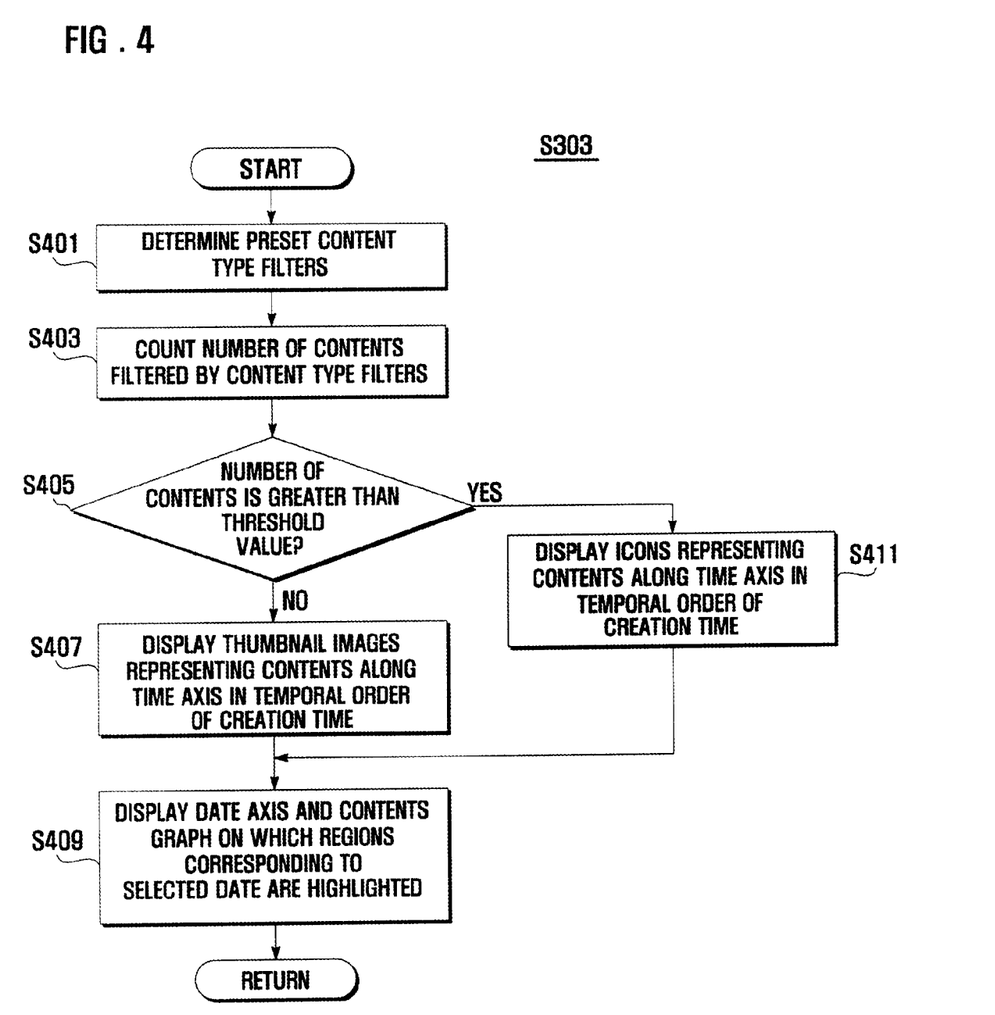
FIG. 4 is a flowchart illustrating a method for a default contents display process according to an exemplary embodiment of the present invention.

Upon detection of the life diary mode activation command, the control unit 109 displays the contents retrieved in a default option in step S303. For example, the control unit 109 retrieves the contents created on a date for today. As described above, the control unit 109 monitors the creation of the contents and stores the contents created in real time. The control unit determines the time at which the life diary mode is activated, i.e., today, and retrieves the contents with a creation date for today. Next, the control unit 109 displays the retrieved contents according to the default option. An exemplary default contents display process is described in more detail with reference to FIG. 4. FIG. 4 is a flowchart illustrating an exemplary default option of a contents display process.

Referring to FIG. 4, the control unit 109 determines the content type filters activated in the contents filter in step S401. The content type filters correspond to the types of contents, i.e., photos, blogs, videos, phonebook items, schedule items, call logs and messages.

The control unit 109 determines a number of contents to be filtered by each content type filter in step S403. In an exemplary implementation, the control unit 109 counts the number of contents created on a date for today by the contents type.

In step S405, the control unit 109 compares the number of contents with a threshold value determines whether the number of contents of each content type is greater than the threshold value. If it is determined that the number of contents is equal to or less than the threshold value, the control unit 109 controls the contents to be displayed in the form of thumbnail images along the time axis in temporal order of the creation time in step S407.

After presenting the contents, in step S409, the control unit 109 controls the contents graph, which a date in the today region is highlighted in order to distinguish from other date regions, to be displayed as shown in an exemplary life diary mode screen of FIGS. 6A and 6D.

In FIG. 6A, the date for today is selected on the date axis 3, and the content type filters for filtering photos, videos and blogs are activated in the contents filter such that the content thumbnails of photos, videos and blogs are presented on the life diary screen. As described above, the life diary screen of FIG. 6A may include a specific user selected from the world select box 7. In FIG. 6D, a date for today is selected on the date axis 3 and the content type filters for filtering photos, videos, blogs, phonebook items, schedule items, call logs and messages are activated in the contents filter such that the content thumbnails of photos, videos, blogs, phonebook items, schedule items, call logs and messages are presented on the life diary screen. As described above, the life diary screen of FIG. 6D may be of a friend selected from the friend select box 6.

If it is determined that the number of contents is greater than the threshold value in step S405, the control unit 109 controls the contents to be displayed in the form of icons along the time axis in temporal order of the creation time in step S411. Next, in step S409, the control unit 109 controls the contents graph, which the date in the today region is highlighted in order to distinguish from other dates regions, to be displayed as shown in FIG. 6E.

FIG. 6E is a life diary screen image including a contents graph with per-content type curves and an integrated curve according to an exemplary embodiment of the present invention. In FIG. 6E, the content type filters for filtering photos, videos, blogs, phone book items, schedule items, call logs and messages are activated in the contents filter and the filtered contents are displayed in the form of icons. As described above, the life diary screen of FIG. 6E may include the user or a friend selected from the friend select box 6. Although more than one date is selected on the date axis in FIG. 6E, the above described multi dates-based display process is not applied hereto because the contents for today display process in step S303 is activated.

An exemplary method for displaying the contents created on a date for today has been described, but is not limited thereto.

Returning to FIG. 3, after displaying the contents in the default format through steps S301 and S303, the control unit 109 detects a user input and determines whether the user input is a life diary mode command in step S305.

Figure 5A:
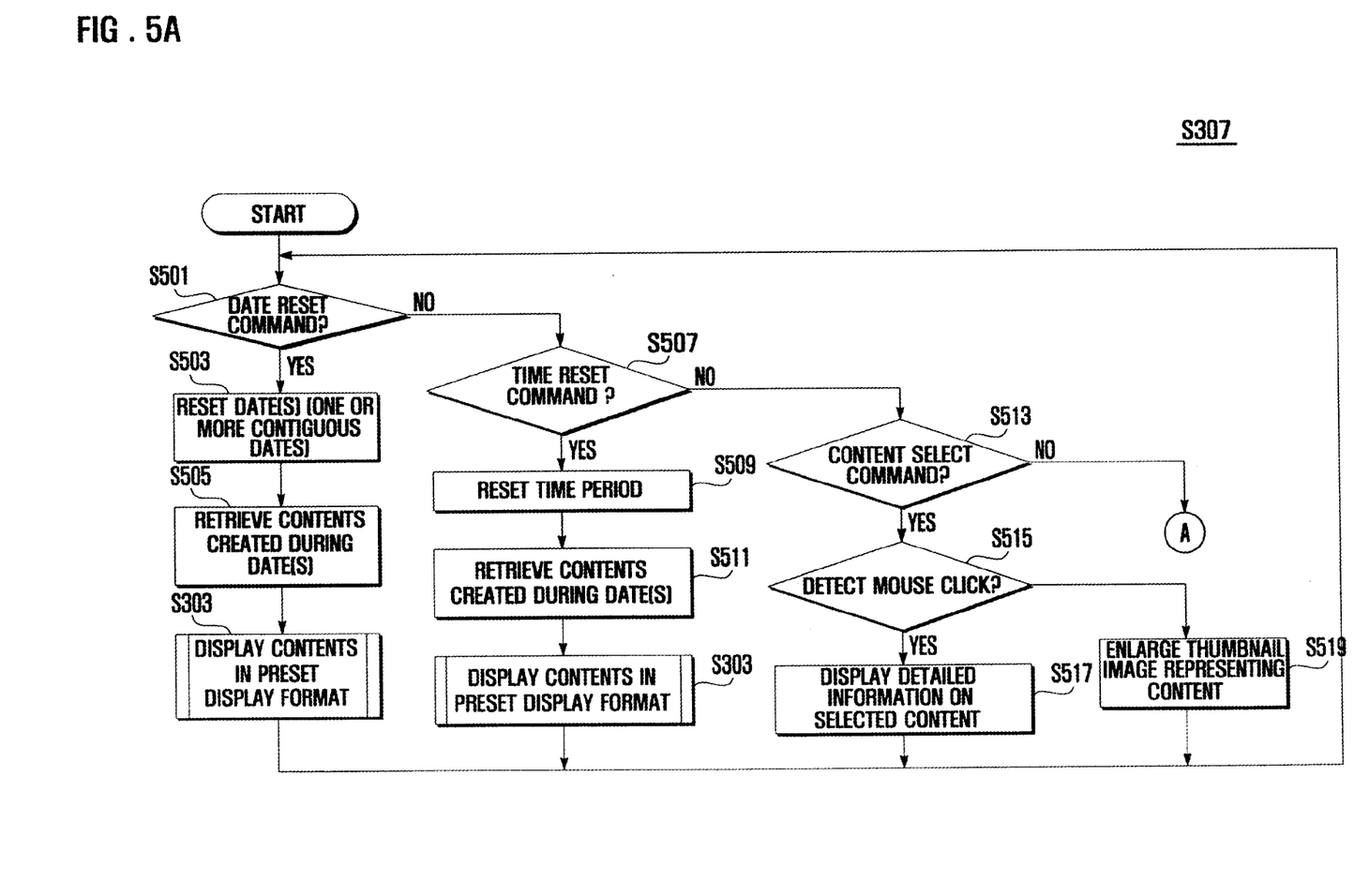
FIGS. 5A and 5B are flowcharts illustrating methods for a life diary screen display process according to an exemplary embodiment of the present invention.
Figure 5B:
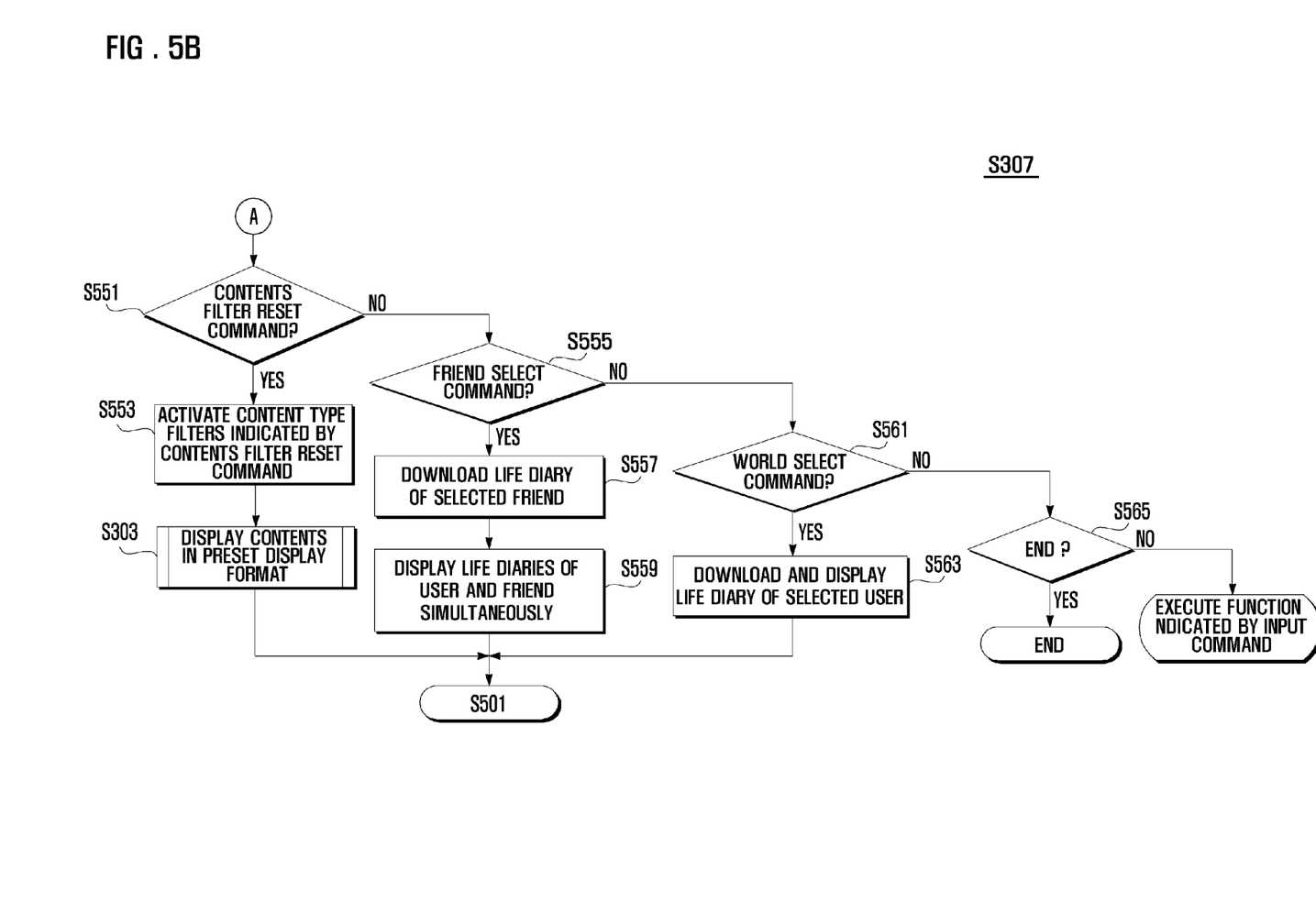

If a user input is a life diary mode command, the control unit 109 controls the life diary screen to be refreshed according to the life diary mode command in step S307. The life diary mode command may include modifying the data axis 3, time axis 1, content objects 4, contents filter 5, friend select box 6 and world select box 7 (see FIG. 6A). The display modification process is described in more detail with reference to FIGS. 5A and 5B. FIGS. 5A and 5B are flowcharts illustrating a method for the display modification process according to an exemplary embodiment of the present invention.

Referring to FIG. 5A, when the life diary mode command is detected, the control unit 109 determines whether the life diary mode command is a date reset command in step S501. If it is determined that the life diary mode command is a date reset command, the control unit 109 controls the date(s) indicated by the date reset command to be set on the date axis in step S503. Here, the date reset command may indicate one or more dates to be selected. FIGS. 6A and 6D illustrate a single date that is selected, and FIGS. 6B and 6E illustrate multiple dates that are selected.

After setting the date(s) indicated by the date reset command on the date axis, the control unit 109 retrieves the contents created during the selected date(s) in step S505. Here, the control unit 109 determines the creation times of the contents stored in the contents storage 117 and retrieves the contents with creation times in the range of the selected date(s).

Next, the control unit 109 controls the retrieved contents to be displayed in the life diary screen in a preset display format in step S303. The life diary screen display process is performed in the same manner as in step S303 (FIG. 4) of FIG. 3.

After completing the life diary screen display process in step S303, the control unit 109 repeats step S501 to monitor user input.

If it is determined that the life diary mode command is not a date reset command in step S501, the control unit 109 determines whether the life diary mode command is a time reset command in step S507.

If it is determined that the life diary mode command is a time reset command, the control unit 109 resets a time period as indicated in the time reset command in step S509. Here, the time period may be set in a unit of time used along the time axis, e.g., an hour. That is, the time reset may be done in one or more hours. For example, if the time axis is divided in 6 hours, the time reset may be done in 6 hours, e.g., 0-6 hours and 6-12 hours.

After resetting the time period, the control unit 109 retrieves the contents created in the reset time period in step S511. Here, the control unit 109 determines the creation times of the contents stored in the contents storage 117 and retrieves the contents created in the reset time period.

Next, the control unit 109 controls the retrieved contents to be displayed in the life diary screen in the preset display format in step S303. The life diary screen display process is performed in the same manner as in step S303 (FIG. 4) of FIG. 3. After completing the life diary screen display process in step S303, the control unit 109 repeats step S501 to monitor user input.

If it is determined that the life diary mode command is not a time reset command, the control unit 109 determines whether the life diary mode command is a content select command in step S513. The user may select a content displayed in the form of a thumbnail image or an icon on the life diary screen.

If it is determined that the life diary mode command is a content select command, the control unit 109 determines whether an information request command (e.g., a mouse click event) is detected in step S515. The user may select a content by clicking a mouse button while the mouse cursor is positioned on the thumbnail image or the icon, which represents the content. The content selection is done by using an exemplary mouse (not shown) in the present invention, but is not limited thereto.

Figure 7B:
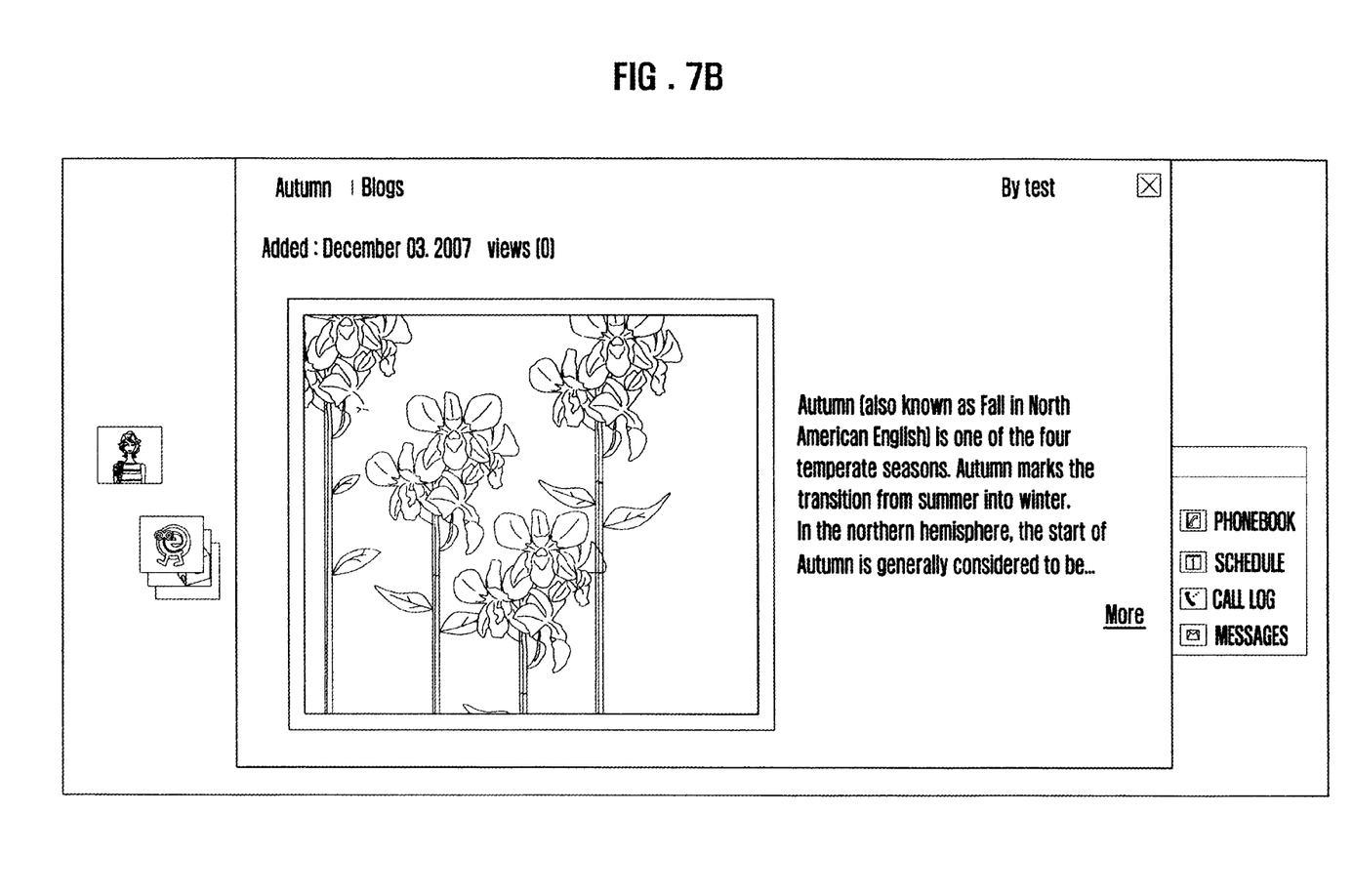
FIG. 7B is a diagram illustrating a method for displaying detailed information of a selected content in a contents information display method according to an exemplary embodiment of the present invention.

If it is determined that no information request command is detected, in step S519, the control unit 109 controls the thumbnail image or the icon, which represents a content, on which the cursor is positioned to be enlarged in size as shown in FIGS. 7A and 7B. FIGS. 7A and 7B are partial images of the life diary screen illustrating an exemplary method for a content selection process.

As shown in FIG. 7A, when the cursor 17 is positioned on a thumbnail image representing a content, the control unit 109 controls the thumbnail to be enlarged on the life diary screen.

After displaying the thumbnail image in an enlarged view, the control unit 109 repeats step S501 to monitor user input.

If it is determined that an information request command is detected in step S517, the control unit 109 controls the detailed information on the selected content to be displayed in step S517. The user may select a content by only positioning the cursor on a thumbnail image of the content. The user may then request detailed information on the content by clicking a mouse button while the cursor stays on the thumbnail. FIG. 7B shows a screen image illustrating a method for displaying detailed information on the selected content. As shown in FIG. 7B, the detailed information may include the content type, content name, content creation date and other content information.

Meanwhile, if it is determined that the life diary mode command is not a content select command in step S513, the control unit 109 determines whether the life diary mode command is a contents filter reset command in step S551. If it is determined that the life diary mode command is a contents filter reset command, the control unit 109 activates a content type filter(s) indicated by the contents filter reset command in step S553. The contents reset command may indicate a set of content type filters for filtering photos, blogs and videos as shown in FIG. 6A, and photos, videos, blogs, phonebook items, schedule items, call logs and messages as shown in FIGS. 6C, 6D and 6E.

After resetting the contents filter, the control unit 109 displays the contents filtered by the reset content type filters in the form of thumbnail images or icons in step S303. This life diary screen display process is performed in substantially the same manner as in step S303 (FIG. 4) of FIG. 3. After completing the life diary screen display process in step S303, the control unit 109 repeats step S501 to monitor user input.

If it is determined that the life diary mode command is not the contents filter reset command, the control unit 109 determines whether the life diary mode command is a friend select command in step S555.

If it is determined that the life diary mode command is a friend select command, the control unit 109 downloads a life diary of the friend indicated by the friend select command in step S557. The user may select a friend from the friend select box 6 in FIG. 6A such that when a friend is selected, the control unit 109 controls the communication unit 101 to download the life diary of the selected friend via a network.

Next, the control unit 109 controls the life diary of the selected friend to be displayed in the form of the life diary screen in step S559. If the user's life diary (i.e., my life diary) has been displayed before selecting a friend, the control unit 109 may control the user's life diary and the selected friend's life diary to be simultaneously displayed in the same life diary screen. That is, the control unit 109 may display the thumbnail images or icons representing the user's and selected friend's contents created in the preset time period to be simultaneously displayed in the same life diary screen, but is not limited thereto. For example, when a friend is selected from the friend select box while displaying the user's life diary, the control unit 109 may display only the selected friend's life diary. Also, the friend's life diary may be controlled such that entire information or partial information of the friend is displayed according to a setting configured by the friend.

After displaying the friend's life diary, the control unit 109 repeats step S501 to monitor user input.

If it is determined that the life diary mode command is not a friend select command, the control unit 109 determines whether the life diary mode command is a world select command in step S561. The user may select a specific user from the world select box to display the life diary of the selected user.

If it is determined that the life diary mode command is a world select command, the control unit 109 downloads a life diary of the selected user and displays the downloaded life diary in step S563. Here, the control unit 109 detects the world select command which is generated by selecting a specific user from the world select box 7 (see FIG. 6A). When the world select command is detected, the control unit 109 activates the communication unit 101 to download the life diary of the selected user via the network and displays the downloaded life diary on the display unit 103. In this case, the control unit 109 displays only the life diary of the selected user, but is not limited thereto.

After displaying the selected user's life diary, the control unit 109 repeats step S501 to monitor user input.

If it is determined that the life diary mode command is not a world select command, the control unit 109 determines whether the life diary mode command is a life diary mode termination command in step S565. If the life diary mode command is a life diary mode termination command, the control unit 109 controls to end the life diary mode.

As described above, the terminal and method for displaying contents information according to exemplary embodiments of the present invention enables information on the contents stored in the terminal to be presented in temporal order based on creation times to allow the contents information to be used like a diary and ordered information with other users to be temporally shared. Thereby, utilization of contents information in everyday life is improved.

Also, the terminal and method for displaying contents information according to exemplary embodiments of the present invention provides the information on the contents in the form of a life diary screen composed of a contents graph having a contents plane defined by a time and date axes such that content objects representing the contents created on the selected dates are presented on the contents plane in temporal order based on a creation time, when one or more contiguous dates are selected on the date axis. Accordingly, the user intuitively determines temporal information of the contents.

Also, the terminal and method for displaying contents information according to an exemplary embodiment of the present invention allows users of life diary applications to share contents created using their terminals and temporal information of the contents, thereby strengthening user's familiarity.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A terminal comprising:
a memory unit for storing contents and creation times of the contents;
a display unit for displaying a life diary screen comprising a time axis, a date axis and contents graph;
a key input unit for receiving a date selection command for selecting a date on the date axis; and
a control unit, when a date is select through the key input unit, for retrieving contents created on the selected date, displaying the retrieved contents as content objects, counting numbers of contents per date and controlling a display of the contents graph determined based on the number of the contents per date,
wherein the control unit controls the display unit to display content icons as the content objects when the number of contents is greater than a threshold value, and display thumbnail images as the content objects when the number of contents is equal to or less than the threshold value.

2. The terminal of claim 1, wherein the control unit controls the display of content objects comprising the contents along the time axis in a creation time order.

3. The terminal of claim 1, wherein the key input unit receives a time selection for selecting a time period on the time axis after a date is selected.

4. The terminal of claim 1, wherein the control unit controls highlighting the date selected on the date axis and a portion of the contents graph corresponding to the selected date.

5. The terminal of claim 1, wherein the time axis comprises a vertical axis comprising a time of day range and the date axis comprises a horizontal axis comprising a time range of two months.

6. The terminal of claim 1, wherein the life diary screen further comprises a contents filter window comprising content type filters for filtering specific types of contents.

7. The terminal of claim 6, wherein the contents graph comprises curves corresponding to the content types filtered by the content type filters.

8. The terminal of claim 1, wherein the life diary screen further comprises a selection box for selecting another user whose life diary is downloaded through a network.

9. The terminal of claim 1, wherein, when a content object is selected, the control unit controls the display of the content object comprising detailed information of the content, and when a cursor is positioned on the content object, the control unit controls to enlarge the content object.

10. A method for displaying information on contents stored in a terminal, the method comprising:
counting a number of contents per date;
displaying a life diary screen comprising a time axis, a date axis and a contents graph displaying the number of contents along the date axis; and in response to a date selection command, selecting a period on the date axis and displaying content objects representing the contents created at the selected date, wherein the displaying of the content objects comprises:
determining a number of contents created during the period selected on the date axis; and
displaying content icons as the content objects when the determined number of contents is greater than a threshold value and displaying thumbnail images as the content objects when the determined number of contents is equal to or less than the threshold value.

11. The method of claim 10, wherein the content objects are displayed along the time axis in a temporal order based on a creation time.

12. The method of claim 10, wherein the period selected on the date axis comprises at least two contiguous dates.

13. The method of claim 10, wherein the period selected on the date axis and a portion of the contents graph corresponding to the selected period are highlighted.

14. The method of claim 10, wherein the time axis comprises a vertical axis defining a time of day range, the date axis comprises a horizontal axis defining a time range of two months and the contents graph is displayed in parallel with the date axis.

15. The method of claim 10, wherein the life diary screen further comprises a contents filter window comprising content type filters for filtering specific types of contents.

16. The method of claim 15, wherein the contents graph comprises curves corresponding to content types filtered by the content type filters.

17. The method of claim 10, further comprising:
selecting another user for displaying a life diary of the selected user;
downloading through a network a life diary of the selected user; and
displaying the life diary of the selected user.

18. The method of claim 10, wherein the displaying of the content objects comprises:
enlarging a content object, when a cursor is positioned on the content object; and
displaying the content object comprising detailed information of the content, when the content object is selected.

19. The method of claim 10, further comprising:
monitoring a creation of contents before counting the number of contents; and
storing contents creation times together with the contents, when the contents are created.

* * * * *